(12) United States Patent
Amada et al.

(10) Patent No.: US 7,706,424 B2
(45) Date of Patent: Apr. 27, 2010

(54) GAS DISCHARGE LASER SYSTEM ELECTRODES AND POWER SUPPLY FOR DELIVERING ELECTRICAL ENERGY TO SAME

(75) Inventors: Yoshiho Amada, San Diego, CA (US); James A. Carmichael, Valley Center, CA (US); Richard G. Morton, San Diego, CA (US); Richard M. Ness, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 761 days.

(21) Appl. No.: 11/241,850

(22) Filed: Sep. 29, 2005

(65) Prior Publication Data

US 2007/0071058 A1 Mar. 29, 2007

(51) Int. Cl.
*H01S 3/22* (2006.01)
*H02G 3/04* (2006.01)
(52) U.S. Cl. ........................ 372/55; 174/68.1
(58) Field of Classification Search ............... 174/68.1, 174/71 C, 75 C, 88 C; 372/55–57
See application file for complete search history.

(56) References Cited

U.S. PATENT DOCUMENTS

| 3,486,058 A | 12/1969 | Hernqvist | |
|---|---|---|---|
| 4,206,422 A | 6/1980 | Fein et al. | 331/94.5 |
| 4,240,044 A | 12/1980 | Fahlen et al. | 331/94.5 |
| 4,245,194 A | 1/1981 | Fahlen et al. | 331/94.5 |
| 4,247,829 A | 1/1981 | Yagi | 331/94.5 |
| 4,251,781 A | 2/1981 | Sutter | 331/94.5 |
| 4,414,488 A | 11/1983 | Hoffman et al. | 315/39 |
| 4,494,167 A | 1/1985 | Molyneux-Berry | 361/270 |

(Continued)

FOREIGN PATENT DOCUMENTS

JP 58-99854 7/1983

(Continued)

OTHER PUBLICATIONS

Thinh Nguyentat, "Diffusion Bonding—An Advanced Material Process for Aerospace Technology" published 1999, downloaded Dec. 2, 2008 (7 pages).

(Continued)

*Primary Examiner*—Minsun Harvey
*Assistant Examiner*—Phillip Nguyen
(74) *Attorney, Agent, or Firm*—Martine Penilla & Gencarella, LLP

(57) ABSTRACT

A apparatus and method are disclosed which may comprise a fluorine gas discharge laser system and electrode support system which may comprise a first electrode electrically connected to a source of high voltage; a first insulating mechanism insulating the first electrode from ground; a second electrode electrically insulated from the source of high voltage and together with the first electrode forming an elongated discharge region between portions of the first and second electrodes respectively extending along a longitudinal axis of each of the first and second electrodes, defining electrode discharge receiving region end portions; a plurality of current return tines electrically connected to the second electrode and to ground, the tines distributed along the longitudinal extent of the elongated discharge region; a second insulating mechanism electrically isolating the second electrode from ground except through the plurality of current return tines.

15 Claims, 7 Drawing Sheets

U.S. PATENT DOCUMENTS

| | | | |
|---|---|---|---|
| 4,546,482 A | 10/1985 | Bagaglia et al. | 372/86 |
| 4,547,886 A | 10/1985 | Kaminski et al. | 372/59 |
| 4,558,450 A | 12/1985 | Wakalopulos et al. | 372/87 |
| 4,686,682 A | 8/1987 | Haruta et al. | 372/87 |
| 4,696,792 A | 9/1987 | Hobson | 376/377 |
| 4,703,490 A | 10/1987 | Brumme et al. | 372/86 |
| 4,716,013 A | 12/1987 | Veronesi et al. | 376/353 |
| 4,764,339 A | 8/1988 | Lake et al. | 376/353 |
| 4,770,846 A | 9/1988 | Land et al. | 376/353 |
| 4,774,714 A | 9/1988 | Javan | 372/109 |
| 4,795,356 A | 1/1989 | Pauza | 439/225 |
| 4,813,127 A | 3/1989 | Braski et al. | 29/825 |
| 4,876,693 A | 10/1989 | Lucero et al. | 372/82 |
| 4,902,998 A | 2/1990 | Pollard | 336/60 |
| 4,953,172 A | 8/1990 | Gurski | 372/62 |
| 4,953,174 A | 8/1990 | Eldridge et al. | 372/87 |
| 4,959,840 A | 9/1990 | Akins et al. | 372/57 |
| 4,970,112 A * | 11/1990 | Hayami | 428/314.4 |
| 4,983,859 A | 1/1991 | Nakajima et al. | 307/419 |
| 5,018,162 A | 5/1991 | Akins et al. | 372/57 |
| 5,023,884 A | 6/1991 | Akins et al. | 372/57 |
| 5,025,445 A | 6/1991 | Anderson et al. | 372/20 |
| 5,070,513 A | 12/1991 | Letardi | 372/83 |
| 5,090,021 A * | 2/1992 | Nakatani et al. | 372/86 |
| 5,100,609 A | 3/1992 | Oosterkamp | 376/210 |
| 5,149,275 A | 9/1992 | Pitta | 439/98 |
| 5,187,716 A | 2/1993 | Haruta et al. | 372/57 |
| 5,247,534 A | 9/1993 | Muller-Horsche | 372/58 |
| 5,315,611 A | 5/1994 | Ball et al. | 372/56 |
| 5,325,407 A | 6/1994 | Forsyth et al. | 376/205 |
| 5,359,620 A | 10/1994 | Akins | 372/58 |
| 5,448,580 A | 9/1995 | Birx et al. | 372/38 |
| 5,535,233 A | 7/1996 | Mizoguchi et al. | 372/87 |
| 5,557,629 A | 9/1996 | Mizoguchi et al. | 372/87 |
| 5,586,134 A | 12/1996 | Das et al. | 372/38 |
| 5,729,565 A | 3/1998 | Meller et al. | 372/87 |
| 5,763,930 A | 6/1998 | Partlo et al. | 250/504 |
| 5,771,258 A | 6/1998 | Morton et al. | 372/57 |
| 5,771,259 A | 6/1998 | Dvorkin | 372/87 |
| 5,777,273 A * | 7/1998 | Woody et al. | 174/113 R |
| 5,818,865 A | 10/1998 | Watson et al. | 372/56 |
| 5,835,520 A | 11/1998 | Das et al. | 372/57 |
| 5,856,991 A | 1/1999 | Ershov | 372/57 |
| 5,857,868 A | 1/1999 | Findon et al. | 439/310 |
| 5,875,207 A | 2/1999 | Osmanow | 372/86 |
| 5,890,926 A | 4/1999 | Pauza et al. | 439/445 |
| 5,897,847 A | 4/1999 | Jursich et al. | 423/219 |
| 5,936,988 A | 8/1999 | Partlo et al. | 372/38 |
| 5,940,421 A | 8/1999 | Partlo et al. | 372/38 |
| 5,953,360 A | 9/1999 | Vitruk et al. | 372/87 |
| 5,978,394 A | 11/1999 | Newman et al. | 372/32 |
| 6,005,879 A | 12/1999 | Sandstrom et al. | 372/25 |
| 6,018,537 A | 1/2000 | Hofmann et al. | 372/25 |
| 6,021,150 A | 2/2000 | Partio et al. | 372/57 |
| 6,028,872 A | 2/2000 | Partlo et al. | |
| 6,038,055 A | 3/2000 | Hansch et al. | 359/279 |
| 6,067,311 A | 5/2000 | Morton et al. | 372/57 |
| 6,128,323 A | 10/2000 | Myers et al. | 372/38 |
| 6,151,346 A | 11/2000 | Partlo et al. | 372/38 |
| 6,157,662 A | 12/2000 | Scaggs et al. | 372/60 |
| 6,164,116 A | 12/2000 | Rice et al. | 73/1.72 |
| 6,188,709 B1 | 2/2001 | Webb | 372/57 |
| 6,198,759 B1 | 3/2001 | Broderich et al. | 372/39 |
| 6,208,674 B1 | 3/2001 | Webb et al. | 372/57 |
| 6,208,675 B1 | 3/2001 | Webb | 372/58 |
| 6,212,211 B1 | 4/2001 | Azzola et al. | 372/33 |
| 6,219,368 B1 | 4/2001 | Govorkov | 372/59 |
| 6,237,690 B1 | 5/2001 | Nicholson | 166/338 |
| 6,240,112 B1 | 5/2001 | Partlo et al. | 372/57 |
| 6,283,781 B1 | 9/2001 | Mori | 439/310 |
| 6,317,447 B1 | 11/2001 | Partlo | 372/57 |
| 6,442,181 B1 | 8/2002 | Oliver et al. | 372/25 |
| 6,466,599 B1 | 10/2002 | Bragin et al. | 372/58 |
| 6,477,193 B2 | 11/2002 | Oliver et al. | 372/58 |
| 6,477,767 B1 * | 11/2002 | Zhao | 29/828 |
| 6,518,505 B1 * | 2/2003 | Matsui et al. | 174/126.1 |
| 6,528,945 B2 | 3/2003 | Kelly et al. | |
| 6,560,254 B2 | 5/2003 | Stamm | 372/32 |
| 6,654,403 B2 | 11/2003 | Ujazdowski et al. | 372/87 |
| 6,810,061 B2 | 10/2004 | Hori et al. | 372/87 |
| 7,060,905 B1 * | 6/2006 | McMahon | 174/110 R |
| 2002/0021728 A1 | 2/2002 | Newman et al. | 372/55 |
| 2002/0154669 A1 | 10/2002 | Spangler et al. | 372/55 |
| 2002/0167975 A1 | 11/2002 | Spangler et al. | 372/20 |
| 2003/0012234 A1 | 1/2003 | Watson et al. | 372/25 |
| 2003/0031216 A1 | 2/2003 | Fallon et al. | 372/29.01 |
| 2003/0138019 A1 | 7/2003 | Rylov et al. | 372/58 |
| 2007/0079984 A1* | 4/2007 | Nakai et al. | 174/102 R |

FOREIGN PATENT DOCUMENTS

| | | |
|---|---|---|
| JP | 01-179377 | 7/1989 |
| JP | 03-217062 | 9/1991 |
| JP | 03-231480 | 10/1991 |
| JP | 04-305987 | 10/1992 |
| JP | 06-021543 | 1/1994 |
| JP | 2631607 | 4/1994 |
| JP | 06-152007 | 5/1994 |
| JP | 06-152012 | 5/1994 |
| JP | 08-083945 | 2/1996 |
| JP | 2002-509363 | 12/1997 |
| JP | 10-242547 | 9/1998 |
| JP | 2000-058944 | 2/2000 |
| RU | 993758 | 7/1994 |
| RU | 1228750 | 8/1994 |
| WO | WO9925006 | 5/1999 |
| WO | WO9931773 | 6/1999 |
| WO | WO9960679 | 11/1999 |
| WO | WO0038286 | 6/2000 |
| WO | WO01/97345 | 12/2001 |
| WO | WO0198012 | 12/2001 |
| WO | WO0201685 | 1/2002 |
| WO | WO0206509 | 1/2002 |
| WO | WO02/31932 | 4/2002 |

OTHER PUBLICATIONS

Grant Wittenborn, "Diffusion Bonding" Nov. 8, 2001, (8 pages).

* cited by examiner

GAS DISCHARGE LASER SYSTEM ELECTRODES AND POWER SUPPLY FOR DELIVERING ELECTRICAL ENERGY TO SAME

CROSS-REFERENCE TO RELATED APPLICATIONS

The present application is related to U.S. Pat. No. 6,711,202, entitled DISCHARGE LASER WITH POROUS INSULATING LAYER COVERING ANODE DISCHARGE SURFACE. issued to Morton on Mar. 23, 2004; and U.S. patent application Ser. No. 10/672,722, entitled ANODES FOR FLUORINE GAS DISCHARGE LASER, filed on Sep. 26, 2003, published on Apr. 15, 2004, Pub. No. 20040071178; and Ser. No. 10/672,182, entitled ELECTRODES FOR FLUORINE GAS DISCHARGE LASER, filed on Sep. 26, 2003, published on Aug. 26, 2004, Pub. No. 20040165638; and Ser. No. 10/672,181 filed on Sep. 26, 2003, published on Apr. 8, 2004, Pub. No. 20040066827; and U.S. Pat. No. 6,414,979, entitled GAS DISCHARGE LASER WITH BLADE-DIELECTRIC ELECTRODE, issued to Ujazdowski et al. on Jul. 2, 2002; and U.S. Pat. No. 6,690,706, entitled HIGH REP-RATE LASER WITH IMPROVED ELECTRODES, issued to Morton et al. on Feb. 10, 2004, and U.S. Pat. No. 6,711,202, entitled DISCHARGE LASER WITH POROUS INSULATING LAYER COVERING U.S. Pat. No. 6,882,674, entitled 4 KHZ GAS DISCHARGE LASER SYSTEM, issued to Wittak et al on Apr. 19, 2005; and U.S. patent application Ser. No. 10/606,412, entitled METHOD AND APPARATUS FOR ELECTRONICALLY INTERCONNECTING HIGH VOLTAGE MODULES POSITIONED IN RELATIVELY CLOSE PROXIMITY, filed on Jun. 25, 2003, published on Dec. 30, 2004, Pub. No. 20040266235, and U.S. patent application Ser. No. 10/607,407, entitled METHOD AND APPARATUS FOR COOLING MAGNETIC CIRCUIT ELEMENTS, filed on Jun. 25, 2003, published on Dec. 30, 2004; the disclosures of each of which are hereby incorporated by reference.

FIELD OF THE INVENTION

The present invention related to gas discharge laser comprising fluorine gas lasing medium electrodes and a mechanism an apparatus for supplying power to the electrodes.

BACKGROUND OF THE INVENTION

As noted in an above referenced application(s) or patent(s), a fluoride layer generated on the anode in rare gas fluoride excimer lasers (a so-called reef due to its resemblance to a marine coral reef albeit on a much smaller scale) can greatly reduce the erosion rate, thereby increasing anode operating lifetime by at least a factor of 5×, and more likely a factor of 10×. However, unless the fluoride layer is distributed evenly across the surface of the discharge region, e.g., in the gas flow direction, and, e.g., along the entire length of the discharge, it can cause local, severe erosion of the opposing cathode surface, which can leads to pulse energy and other instabilities. Applicants propose and apparatus and method of operation to alleviate such problems.

Coaxial cable has traditionally been used for high voltage power connections between modules in pulsed powered lasers, e.g., for integrated circuit photolithography processing uses, e.g., in applicant's assignee's below noted laser systems, e.g., in connections from a high voltage power supply ("HVPS") to a commutator section of a magnetic switch pulsed power system and from the commutator to a compression head portion of the pulsed power system, a so-called solid state pulse power system. The HVPS may be connected to the commutator section through, e.g., a resonant charger circuit. However, in many cases, the power delivered is not continuously applied. That is, the power is delivered in the form of pulses. The fundamental (and harmonic) frequency of these pulses can often result in a skin effect applied to the coaxial cable conductors (both the center conductor and outer return braid). This can have unwanted effects when the voltage and current delivered by the HVPS and inter-section connections is high as is the case with solid state magnetic switched pulsed power systems, e.g., for ArF, KrF, XeF, XeCl, $F_2$ and like excimer/molecular fluorine laser systems, e.g., used in integrated circuit photolithography. The higher the pulse repetition rate, e.g., as these systems require upwards of 6 kHz and greater pulse repetition rates, the worse the problem. Applicants propose according to aspects of an embodiment of the present invention to alleviate such problems.

As noted in the above referenced co-pending patent application Ser. No. 10/607,407 a pulse power circuit known in the art, e.g., for use in supplying high pulse repetition rate (4 kHz and above) electrical pulses between electrodes in a gas discharge laser system may include, e.g., a high voltage resonant power supply, a commutator module, a compression head module and a laser chamber module. High voltage power supply module can comprise, e.g., for a 4 kHz pulse repetition rate laser a 600 volt rectifier for, e.g., converting the 480 volt three phase normal plant power from an electrical power AC source to about 600 volt DC. An inverter, e.g., converts the output of the rectifier to, e.g., high frequency 600 volt pulses in the range of 10 kHz to 100 kHz. The frequency and the on period of the inverter can be controlled, e.g., by a HV power supply control board (not shown) in order to provide course regulation of the ultimate output pulse energy of the system, e.g., based upon the output of a voltage monitor comprising, e.g., a voltage divider.

The output of the inverter can be stepped up to about 800 volts in a step-up transformer. The output of transformer is converted to 800 volts DC by a rectifier, which can include, e.g., a standard bridge rectifier circuit and a filter capacitor. A Resonant charger module can be used to take the DC output of circuit, e.g., to resonantly pulse charge, e.g., an 5.1 µF charging capacitor $C_0$ in the commutator module as directed by a control board, which can, e.g., control the operation of the Resonant charger module to set this voltage. Set points, e.g., within the HV or Resonant charger control board can be provided by a laser system control board (not shown). In the discussed embodiment, e.g., pulse energy control for the laser system can be provided by a set of power supply and resonant charger modules.

The electrical circuits in commutator module and compression head module may, e.g., serve to amplify the voltage and compress the electrical energy stored on charging capacitor $C_0$ by the power supply and resonant charger modules, e.g., to provide 800-1200 volts to charging capacitor $C_0$, which during the charging cycle can be isolated from the down stream circuits, e.g., by a solid state switch.

The commutator module, which can comprise, e.g., the charging capacitor $C_0$, which can be, e.g., a bank of capacitors connected in parallel to provide a total capacitance of, e.g., 5.1 µ.F, along with the voltage divider, in order to, e.g., provide a feedback voltage signal to the HV power supply or Resonant charger control board which can be used by control board to limit the charging of charging capacitor $C_0$ to a voltage (so-called "control voltage"), which, e.g., when formed into an electrical pulse and compressed and amplified in the commutator and compression head, can, e.g., produce the desired discharge voltage on a peaking capacitor $C_p$ and across electrodes in the lasing cavity chamber.

As is known in the art, such a circuit may be utilized to provide pulses in the range of 3 or more Joules and greater than 14,000 volts at pulse rates of 2,000-4,000 or more pulses per second. In such a circuit, e.g., at 4 kHz about 160 microseconds may be required for DC power supply and Resonant charger modules to charge the charging capacitor $C_0$ to, e.g., 800-1200 volts, and at 6 kHz the charging time is reduced to about 100 microseconds, and so forth as pulse repetition rate increases. Charging capacitor $C_0$, therefore, can, e.g., be fully charged and stable at the desired voltage provided the voltage and current applied to the charging capacitor $C_0$ in the amount of time allowed by the pulse repetition rate can be accomplished. For example, when a signal from a commutator control board is provided, e.g., to close the solid state switch, which, e.g., initiates a very fast step of converting the 3 Joules of electrical energy stored on charging capacitor $C_0$ into, e.g., a 14,000 volt or more charge on peaking capacitor $C_p$ for creating a discharge across the electrodes, provided the charging capacitor has been adequately charged within the time allotted by the pulse repetition rate of the laser system. The solid state switch may be, e.g., an IGBT switch, or other suitable fast operating high power solid state switch, e.g., an SCR, GTO, MCT, high power MOSFET, etc. A 600 nH charging inductor $L_0$ can be placed in series with the solid state switch and employed, e.g., to temporarily limit the current through the solid state switch while it closes to discharge the charge stored on charging capacitor $C_0$ onto a first stage capacitor $C_1$ in the commutator module, e.g., forming a first stage of pulse compression.

For the first stage of pulse generation and compression, the charge on charging capacitor $C_0$ can be switched onto a capacitor, e.g., a 5.3 µF capacitor $C_1$, e.g., in about 4 µs. A saturable inductor can hold off the voltage on capacitor $C_1$ until it saturates, and then presents essentially zero impedance to the current flow from capacitor $C_1$, e.g., allowing the transfer of charge from capacitor $C_1$ through, e.g., a step up transformer, e.g., a 1:25 step up pulse transformer to charge a capacitor $C_{p-1}$ in the compression head module, with, e.g., a transfer time period of about 400 ns, comprising a second stage of compression. The design of pulse transformer is described in a number of prior patents assigned to the common assignee of this application, including, e.g., U.S. Pat. No. 5,936,988. For example, such a transformer is an extremely efficient pulse transformer, transforming, e.g., a 800 volt 5000 ampere, 400 ns pulse to, e.g., a 20,000 volt, 200 ampere 400 ns pulse, which, e.g., is stored very temporarily on compression head module capacitor $C_{p-1}$, which may also be, e.g., a bank of capacitors. The compression head module may, e.g., further compress the pulse. A saturable reactor inductor $L_{p-1}$, which may be, e.g., about a 125 nH saturated inductance, can, e.g., hold off the voltage on capacitor $C_{p-1}$ for approximately 400 ns, in order to, e.g., allow the charge on $C_{p-1}$ to flow, e.g., in about 100 ns, onto a peaking capacitor $C_p$, which may be, e.g., a 10.0 nF capacitor located, e.g., on the top of a laser chamber and which the peaking capacitor $C_p$ is electrically connected in parallel with the laser system electrodes. This transformation of a, e.g., 400 ns long pulse into a, e.g., 100 ns long pulse to charge peaking capacitor $C_p$ can make up, e.g., the second and last stage of compression. About 100 ns after the charge begins flowing onto peaking capacitor $C_p$ mounted on top of and as a part of the laser chamber in the laser chamber module, the voltage on peaking capacitor $C_p$ will have reached, e.g., about 20,000 volts and a discharge between the electrodes begins. The discharge may last, e.g., about 50 ns, during which time, e.g., lasing occurs within the resonance chamber of the, e.g., excimer laser.

SUMMARY OF THE INVENTION

A apparatus and method are disclosed which may comprise a fluorine gas discharge laser system and electrode support system which may comprise a first electrode electrically connected to a source of high voltage; an insulating mechanism insulating the first electrode from ground; a second electrode electrically insulated from the source of high voltage and together with the first electrode forming an elongated discharge region between portions of the first and second electrodes respectively extending along a longitudinal axis of each of the first and second electrodes, defining electrode discharge receiving region end portions; a plurality of current return tines electrically connected to the second electrode and to ground, the tines distributed along the longitudinal extent of the elongated discharge region; an isolating mechanism electrically isolating the second electrode from ground except through the plurality of current return tines. The apparatus and method may comprise the first electrode comprising a cathode; the second electrode comprising an anode; a laser system chamber comprising ground; the isolating mechanism comprising an electrode mounting mechanism that electrically isolates the second electrode from the chamber other than through the current return tines. The isolating mechanism may comprise an inductance enhancing mechanism that counteracts the increased strength of the electric field in an electrode discharge receiving region end portion; and/or may comprise a reef growth enhancing mechanism promoting the growth of a protective reef in an electrode discharge receiving region end portion and/or may comprise a streamer (arc-like) discharge reduction mechanism reducing the streamer (arc-like) discharge, e.g., by reducing the current density in an electrode discharge receiving region end portion. A gas discharge laser system electrode power supply system operating at 4 kHz and above and method of operation is disclosed that may comprise a magnetic switch pulse compression system having at least one stages of pulse compression between an input charging capacitor and a peaking capacitor, the peaking capacitor electrically connected across a pair of electrodes forming a gas discharge region between the electrodes; a high voltage power supply supplying voltage to the input charging capacitor; a resonant charging circuit within the high voltage power supply; a connector cable making electrical connection between at least one of the high voltage power supply and the magnetic switch pulse compression system, the stages within the magnetic switch pulse compression system or the resonant charging circuit and another portion of the high voltage power supply, the connector cable may comprise a coaxial cable comprising a core comprising a plurality of wires in a litz wire configuration. The coaxial cable may comprise a braided shield comprising a plurality of braided or compacted litz wire braid each litz wire in the braided or compacted litz wire braid comprising a single or multiple litz wire configuration.

DETAILED DESCRIPTION OF PREFERRED EMBODIMENTS

Figure 1:
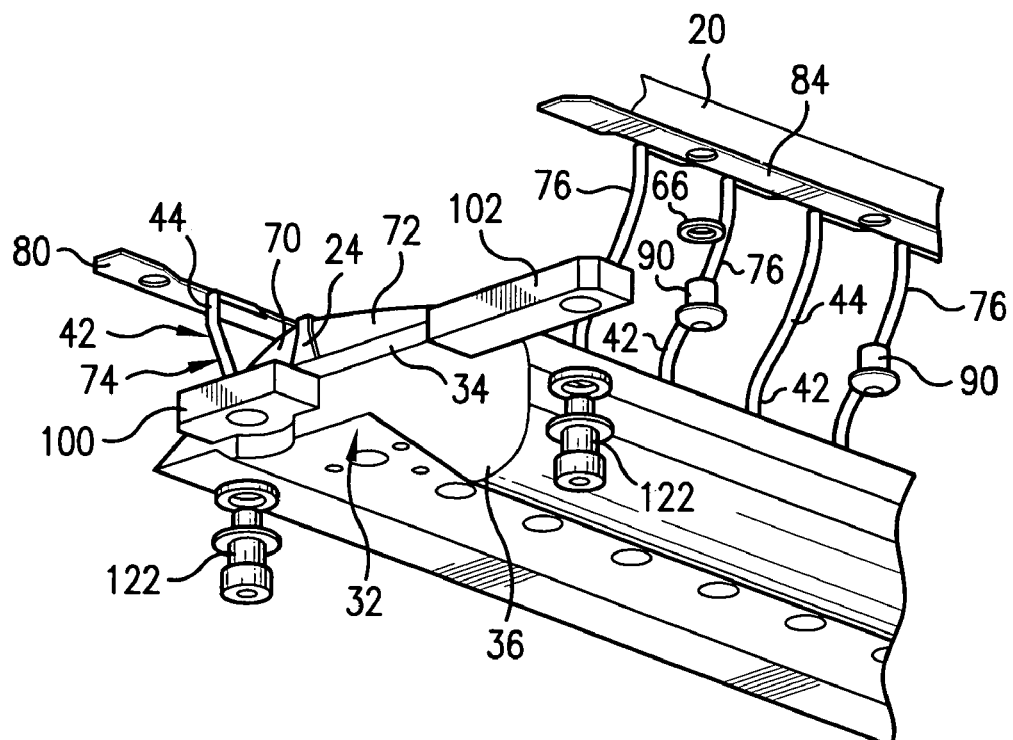
FIG. 1 shows an orthogonal perspective cut-off view of a portion of an anode support and current return system.

One factor contributing to the uniformity of the fluoride reef layer is the spatial uniformity of the current density in the discharge between the electrodes laterally and longitudinally along the discharge regions of the cathode and anode. In existing configurations of laser systems sold by applicants' assignee, Cymer, Inc., e.g., XLS 7XXX single chamber laser systems and XLA-1XX multi-chamber laser systems, e.g., as illustrated by way of example in FIG. 1, an anode 24 supported by an anode support bar 32 may be fitted with a plurality of current return tines 40, each having a thin edge 42 generally orthogonal to lasing gas medium gas flow through a gas discharge region 28 between the anode 24 and a cathode 22, and generally broader facing sides 44 generally parallel to the gas flow direction. The return current is, therefore, is carried by this series of thin metallic vanes or wires (tines) 40, which may be spaced in such a way as to promote uniform loop inductance along the length of the discharge, and spaced and shaped also so as to minimize impedance to gas flow.

The tines 40 can be, e.g., arranged with the thin edges orthogonal to the gas flow direction, e.g., to minimize drag on the passing gas flow. Although this geometry can maintain a relatively constant loop inductance for most of the discharge length along the length of the discharge region between the electrodes, inductance at the ends of the discharge region have been discovered to be significantly enough lower to impact operation, e.g., the formation of a reefing porous dielectric coating on the discharge regions of the electrodes. Due to current flow through the anode support bar 32 to the grounded chamber walls 20 applicants have discovered that the ends of the discharge regions on the anode 24 can be prone to disturbances that can alter the reefing phenomena. For example with higher local current densities than the regions of the discharge more close to the longitudinally central region of the discharge, the current density required for maintenance of a fluoride reef layer on the anode can be exceeded.

Consequently, e.g., the end regions have been determined to experience higher cathode and anode erosion rates than the central region and the streamers are also believed to launch much stronger acoustic disturbances that can interfere with subsequent discharges via refractive index gradients in wave fronts reflected from the chamber walls and certain other internal component surfaces.

According to aspects of an embodiment of the present invention applicants propose an apparatus and method of eliminating the anode support bar/chamber end wall current path contribution to lowering inductance, e.g., at the electrode ends and thus promoting more longitudinally and laterally uniform production of the porous dielectric reef. According to aspects of an embodiment of the present invention applicants propose to remove the current path that lowers the discharge end-region inductance, thereby promote more uniform formation of the fluoride layer required for extended operating life of the anode, e.g., to allow current return only through the current return tines 40 and not through the anode support bar 32 directly to the grounded chamber wall 20.

According to aspects of an embodiment of the present invention applicants propose to minimize or at least significantly reduce undesirable inductive end effects that can contribute to uneven reefing along the longitudinal axis of the anode and cathode discharge regions and therefore to energy and other instabilities in the laser output pulses. Photolithographic applications of DUV excimer lasers continue to demand ever improving stability of every aspect of the laser pulses, including the pulse energy delivered to photoresist materials. By eliminating the end-inductance reduction caused by current returning through the anode support bar and chamber walls by, e.g., electrically isolating the anode/current return cage from the anode support bar more longitudinally uniform reefing and laterally uniform reefing at the electrode ends can be promoted. Several embodiments are possible.

Figure 2:
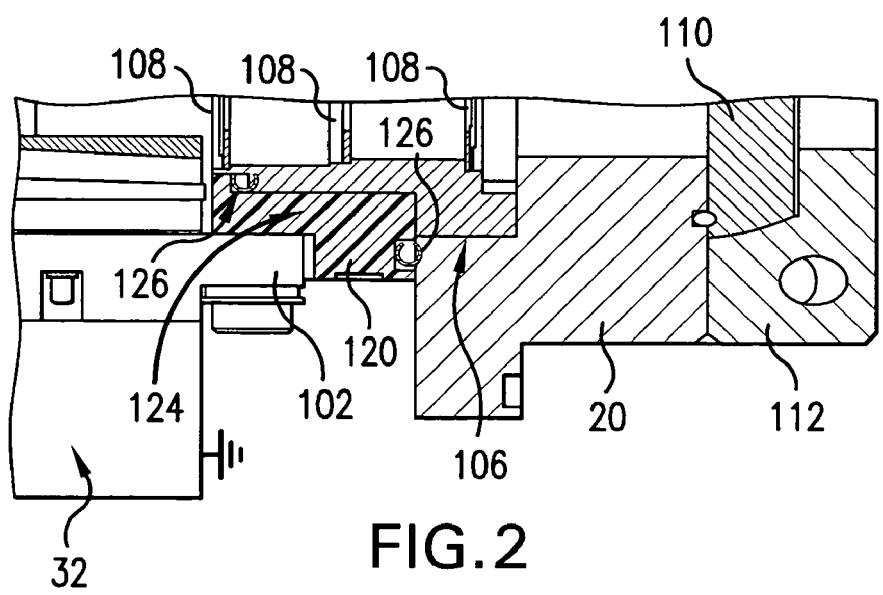
FIG. 2 shows a cross-sectional partly cut-off view of an anode support bar and current return system.
Figure 3:
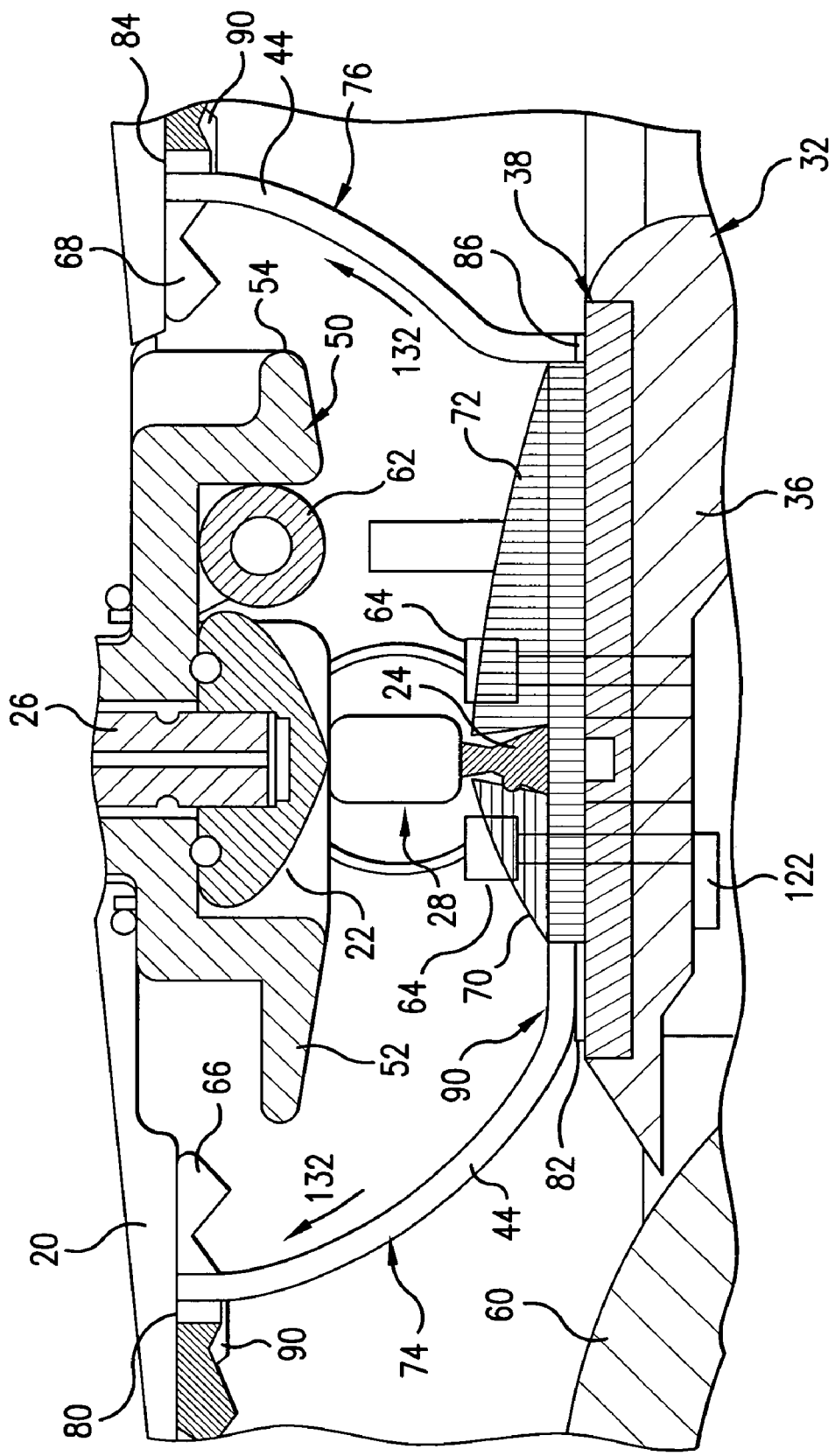
FIG. 3 illustrates partly in cross-section and partly schematically aspects of an embodiment of an electrode support and electrical connection arrangement.

According to aspects of an embodiment shown by way of illustration and partly schematically in FIGS. 1-3 a portion of the contents of a laser chamber of a laser system is shown which may comprise a upper chamber wall 20. The chamber upper wall may have passing through it a plurality of high voltage feedthroughs 26, supplying high voltage (e.g., high negative voltage of about 900-1300 volts) to a cathode electrode 22. Opposing the cathode electrode 22 may be, e.g., an anode electrode 24, with the cathode electrode 22 and the anode electrode 24 extending longitudinally as shown for the anode 24 in the perspective view of FIG. 1 and into the plane of the paper as shown in the cross-sectional view of FIG. 3, to form a longitudinally elongated discharge region where the anode electrode 24 discharge receiving portion and cathode electrode 22 discharge receiving portion oppose each other across the discharge region 28. The high voltage feed through 26 may be fed from a high voltage pulsed power supply compression head bus (not shown).

The anode electrode 24 may be supported within the lasing chamber by an anode support bar 32, which may include an anode support shelf 34, which may be supported upon or an integral part of an anode support bar lower portion 36. The anode support bar may be electrically connected, e.g., to the chamber upper half 20, e.g., by a plurality of current return tines, e.g., including upstream current return tines 74 and downstream current return tine 76, each having, e.g., a relatively thin edge 42, e.g., facing the upstream and downstream direction of gas flow from the fan 60 through the discharge region 28, i.e., orthogonal to the gas flow direction and a relatively broad side facing generally parallel to the gas flow direction.

The high voltage feedthroughs 26 may pass through a main insulator 50, insulating the high voltage from the grounded chamber wall 20, and the main insulator 50 may have a flow shaping upstream wing 52 and a flow shaping downstream wing 54, respectively on the upstream side and downstream side of the gas flow from the fan 60 through and past the electric discharge region 28. A preionizer 62 may be contained in a recess in the main insulator 50 to provide ions for helping to initiate the electric discharge between the electrodes 20, 22 in the discharge region 28 in a lasing gain medium, e.g., for halogen based excimer (e.g., ArF, KrF, XeCl, XeF, or $F_2$) lasers.

The flow through the discharge region 28 may also be shaped by an upstream fairing 70, e.g., made of a dielectric material, e.g., ceramic, and a downstream fairing 72, also, e.g., made of ceramic, both of which may, e.g., rest on the anode support shelf 34, and, e.g., be attached to the anode support bar 32 or support shelf 34 by suitable means, e.g., by threaded screws 64, e.g., as illustrated by way of example in FIG. 3.

The upstream tines 74 may be attached to the chamber wall 20, e.g., by a longitudinally extending attachment foot 80, which may, e.g., along with a baffle 66, be attached by a screw 90. The upstream tine 74 may also be attached to the anode support bar 32 by a longitudinally extending attachment foot 82, e.g., as shown illustratively in FIG. 3. Similarly the downstream current return tines 76 may be attached to the chamber upper half 20 wall by a longitudinally extending attachment foot 84, along with a baffle 68, by a screw 90 and to the anode support bar by a longitudinally extending attachment foot 86.

As is shown illustratively by way of example in FIG. 2 one end of the anode support bar 32 by way of a downstream attachment flange 102, opposite an upstream attachment flange 100 (shown in FIG. 1) may be attached to a chamber upper half wall 120 with mounting pegs 122, e.g., to also hold in place an aperture enclosure 106 containing a plurality of output window protecting apertures 108. The output window 110 protected by a window carrier 112 and window housing 120 may be secured to the chamber upper half wall 20.

According to aspects of an embodiment of the present invention, as illustrated by an exemplary embodiment, the anode 24 may be electrically isolated from the anode support bar 32 lower portion 36, e.g., by replacing the anode support shelf 34, e.g., with an anode insulator 38, e.g., formed by a dielectric material such as ceramic. By doing so, or also insulating the ends of the anode support bar 32 from the chamber walls, e.g., the chamber upper half 20 the current path for return of current to the chamber wall 20 may be limited to the current return paths 132 through the respective upstream current return tines 74 and downstream current return tines 76.

In addition, according to aspects of an embodiment of the present invention adapted to force the current return through the current return tines 74, 76, as illustrated partly schematically in FIGS. 4-7, various embodiments are shown as examples of how to electrically isolate the anode support bar 32 from either end of the anode support bar 32 from the chamber housing upper half wall 20 (or anything in electrical contact with the chamber, either the upper half wall 20 or lower half 142.

Figure 4:
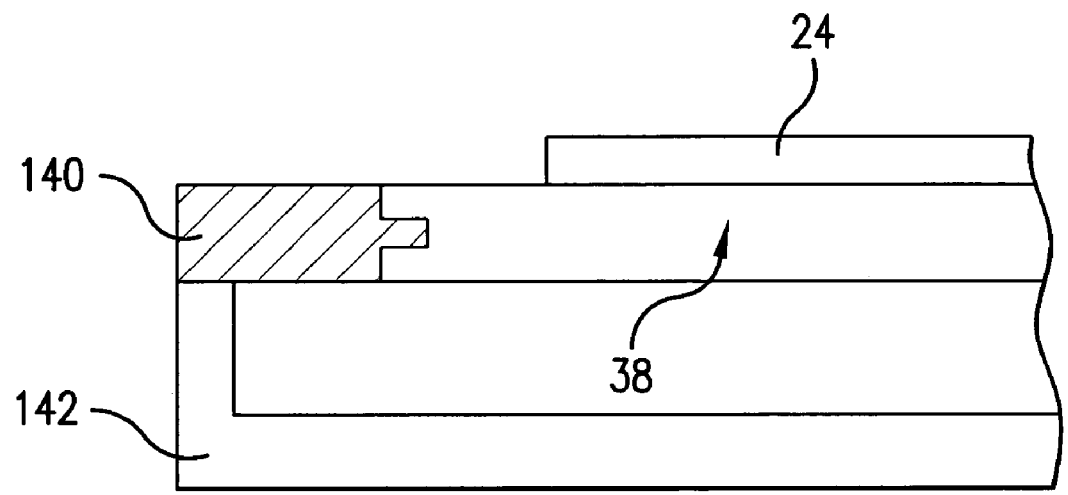
FIG. 4 illustrates partly in cross-section and partly schematically aspects of an embodiment of an electrode support and electrical connection arrangement.
Figure 5:
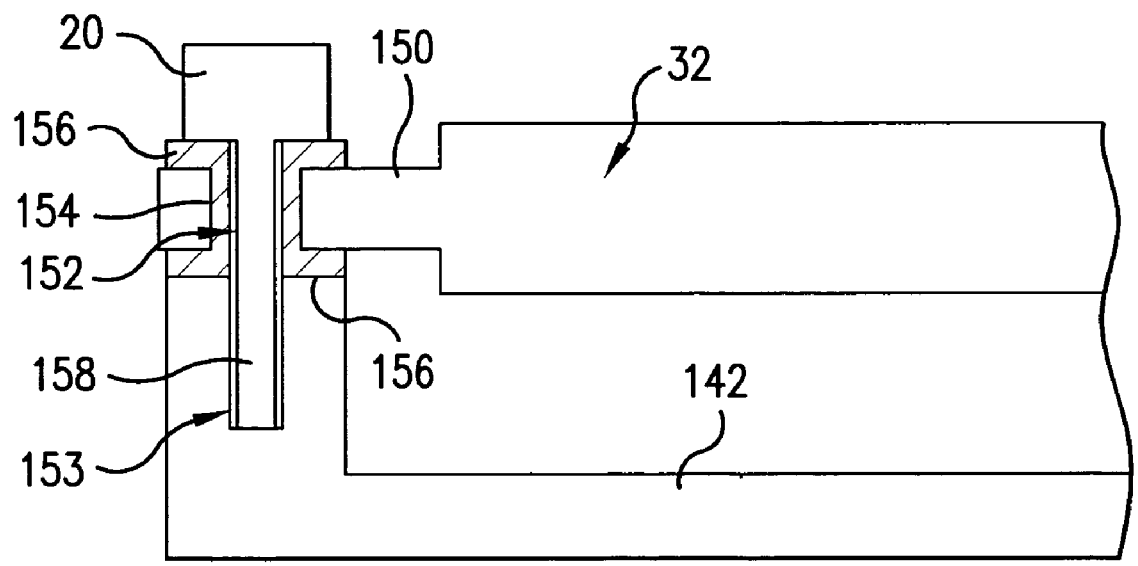
FIG. 5 illustrates partly in cross-section and partly schematically aspects of an embodiment of an electrode support and electrical connection arrangement.
Figure 6:
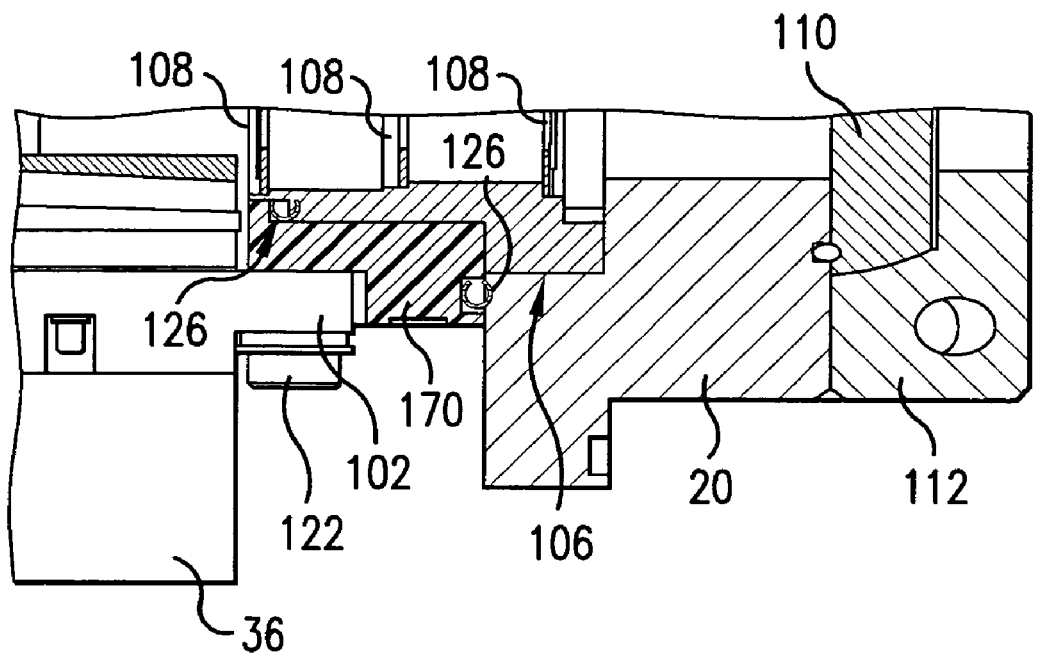
FIG. 6 illustrates partly in cross-section and partly schematically aspects of an embodiment of an electrode support and electrical connection arrangement.
Figure 7:
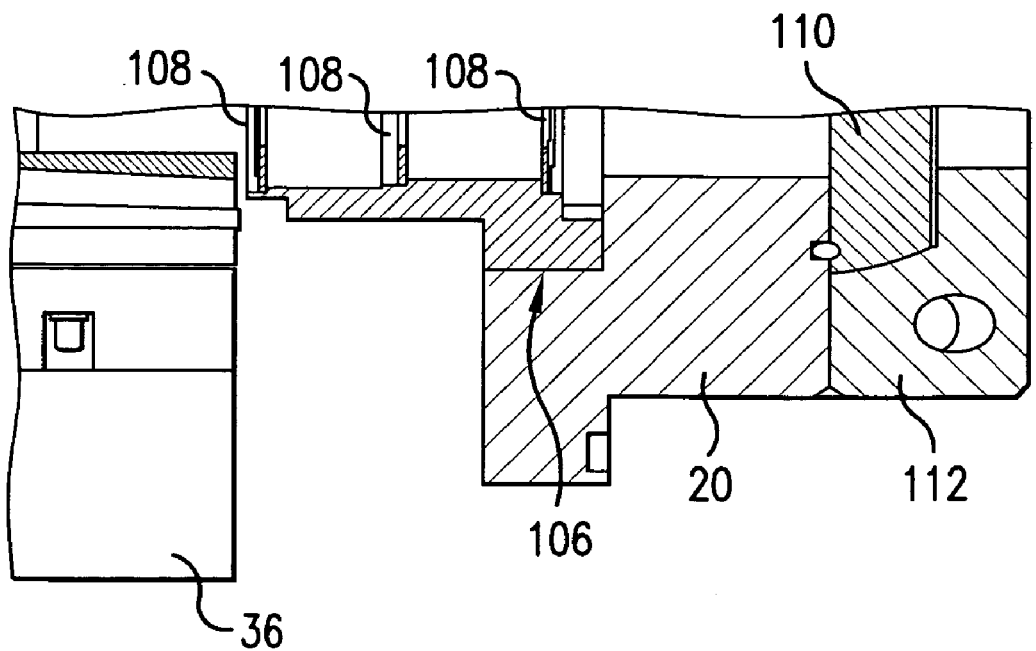
FIG. 7 illustrates partly in cross-section and partly schematically aspects of an embodiment of an electrode support and electrical connection arrangement.

As shown by way of example in FIG. 4, the connection to the chamber upper half 120 or lower half (as illustratively shown) 142 may be made by a connector 140, which may be formed of a ceramic or other dielectric material. FIG. 5 illustrates, by way of example an anode support bar 32 attached to the chamber upper half wall 20 or lower half wall 142, or both, by means of, e.g., a support protrusion 150 through which may be formed, e.g., a hole 152, into which may be inserted an insulating sleeve, e.g., a ceramic sleeve 154. The upper chamber half wall 20 may have a mounting peg 158 with suitable seals 153 that inserts into a mounting peg hole 152 in the chamber lower half wall 142, and, e.g., a pair of ceramic washers 156 may be used (again with suitable seals as appropriate) to insure electrical isolation of the support protrusion 150 and the chamber upper half wall 20 and lower half wall 142. As illustrated in FIG. 6, the metal collar 120 shown in FIG. 2 may be replaced with an insulator, e.g., with a ceramic spacer 170. Finally, as shown in FIG. 7 partly schematically, and by way of example only, the entire attachment mechanism illustrated in FIG. 2 may be removed at both ends of the anode support bar 32. A seal 126 seals the metal collar 120 (in FIG. 2) or the spacer 170 (in FIG. 6). This may necessitate, e.g., at the end (or ends) of the chamber cavity with an aperture enclosure 106 the removal of some of the anode 24, e.g., beyond the end of the longitudinal extension (from right to left in the illustration of FIGS. 2 and 4-7) in order to avoid arcing between grounded elements, e.g., the aperture enclosure 106 and the ends of the anode 24.

Figure 8:
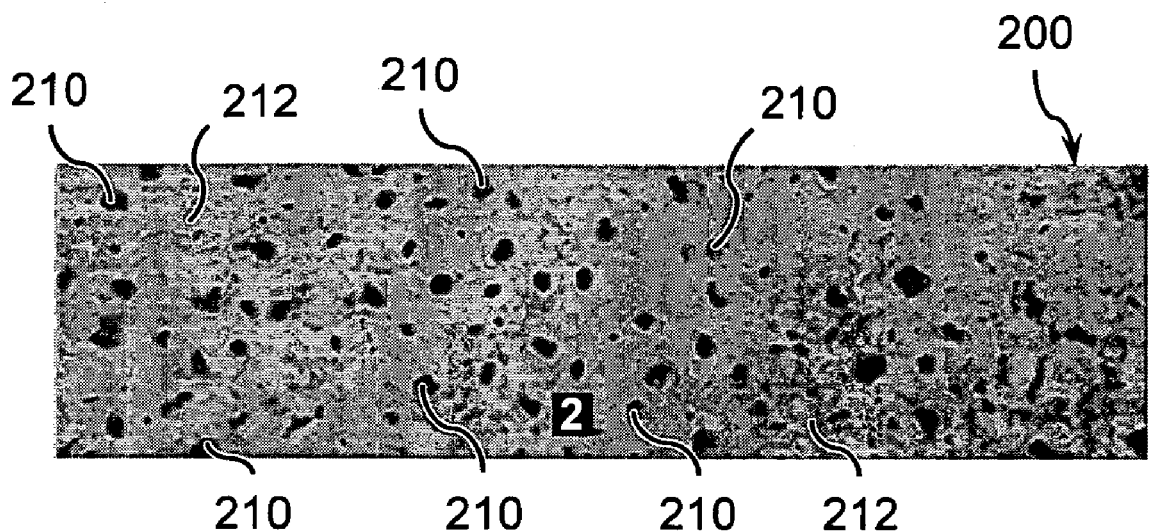
FIG. 8 illustrates an example of a barrier reef formation on an electrode according to aspects of an embodiment of the present invention
Figure 10:
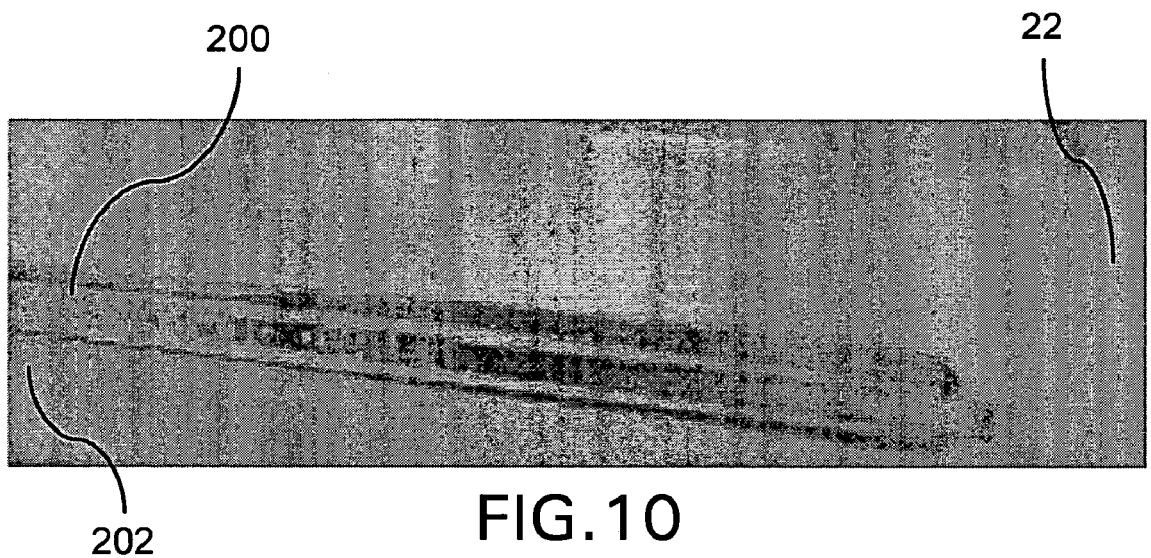
FIG. 10 illustrates an example of the failure of a barrier reef formation to form over the entire length of a discharge receiving portion of an electrode addressed according to aspects of an embodiment of the present invention.

FIG. 8 illustrates a so-called barrier reef 200, which applicants have determined forms, e.g., on the discharge surface of a discharge receiving portion of an electrode in a fluorine containing gas discharge laser, e.g., a KrF laser, due, e.g., to fluorine interaction with materials in the electrode, e.g., an anode electrode made of a longitudinally extending insert of C36000 brass in a base electrode form made of C26000 brass, wherein the barrier reef forms on the C36000 insert defining a discharge receiving portion of the electrode 24. In the central region 202 of the discharge receiving portion of the electrode the reefing is relatively uniform as illustrated in FIG. 10. The reefing as can be seen from FIG. 8, which is a representative view of a barrier reef formed across all of the discharge receiving region, e.g., on the upper surface of a C36000 brass insert (the reefing may also extend over the sides of the electrode onto the C26000 material, e.g., along the solder joint of the insert into the main electrode body, e.g., as shown in FIG. 10) forming, what appears like a coral reef (thus the name barrier reef) which can have relatively uniformly spaced and sized holes 210 distributed in the reef covering the discharge receiving portion. The holes 210 have been determined to extent to the C36000 brass of the insert, i.e., to electrical contact with the anode electrode 24, thus allowing sufficient electrical discharge between the electrodes 22, 24 for suitable lasing, while the coating 212 made of a fluorine compound, e.g., mostly or exclusively copper fluoride (other materials, e.g., from the electrodes, e.g., lead and/or zinc may initialize start reef growth as fluorine compounds, but, eventually mostly or entirely leave the finished reef) once sufficiently thick may, e.g., prevent further erosion of the anode electrode in the discharge receiving portion, e.g., in the insert of C36000 brass.

Figure 9:
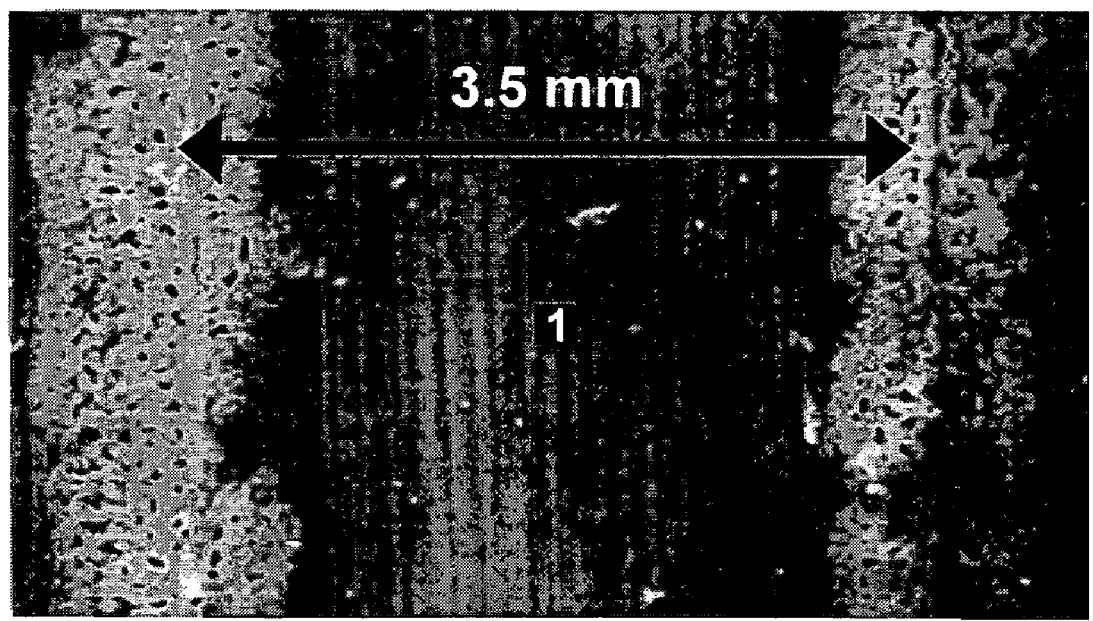
FIG. 9 illustrates an example of the failure of a barrier reef formation to form over the entire length of a discharge receiving portion of an electrode addressed according to aspects of an embodiment of the present invention.

At one or both ends of the electrode, however, the reef 210, 212 formation may be as illustrated in FIGS. 9 and 10, that is, it may extend only along the sides of the discharge receiving region of the anode 24, and as shown, at the very end of where the discharge extends longitudinally along the anode electrode 24, may not even extend along the sides of the discharge receiving portion of the anode electrode. Applicants believe that this phenomenon is actually the result of the electric field at the ends of the electrode discharge receiving portion(s), i.e., generally the longitudinal extent of the opposing discharge producing regions of the electrodes, anode and cathode (the ends may extend further and, e.g., have one or both tapered away from the other to terminate the longitudinal extend of the lasing gas medium discharge region). This is believed to actually cause no reef to form or to destroy any reef that does so form, such that the reefing at least one end of the electrode is as shown illustratively in FIGS. 9 and 10. FIG. 10 shows that most of the region between opposing solder joints, e.g., on an electrode with a soldered-in insert is reef-free.

Applicants believe that this phenomenon can be the result of the electric field being too high at the ends of the electrodes where the discharge is occurring and the resulting arcing and streaming. Even if the reefing is able to form and stay in place n the discharge receiving electrode, which may vary, e.g., from an ArF to a KrF laser or like variation, the arcing and/or streamers at the ends may also cause detrimental pitting of the opposing electrode, e.g., the cathode in the same end region of the discharge receiving portion of the electrodes. thus according to aspect of an embodiment of the present invention electrically isolating the end portions of the grounded electrode, e.g., the anode, from electrical contact with ground (the laser chamber) may serve to foster the beneficial reefing on the anode and also to lengthen the life of the cathode by eliminating detrimental pitting, which can, e.g., over time modify the discharge receiving region at the end of the cathode enough to alter one or more critical laser output light pulse beam parameters necessitating the replacement of the cathode, at least. Thus, by increasing the inductance of the electrical circuit through the lasing gas medium at the ends of the electrode, by electrically isolating the electrode, e.g., the anode, ends from ground, can reduce arcing and streaming at such ends of the electrodes and foster reefing on the anode, which in turn can also reduce the unwanted arcing or streaming.

It will be understood that this phenomenon may occur even where the electrode (as illustrated in FIG. 10) is machined from a single piece of material (e.g. C36000 brass) as opposed to having the insert as illustrated in FIG. 9.

According to aspects of an embodiment of the present invention, applicants have determined that removing the electrical contact at the ends of the electrode, e.g., the anode electrode 24, so that current return is only through the current return tines modifies the electrical properties obtaining in the region of the end (or ends) where the current cannot return to ground through the electrical connection of the end of the anode support bar to the chamber wall(s), e.g., modifies the inductance effects at such end or ends. This has been determined, according to aspects of an embodiment of the present invention to at least enable and also to likely at least promote and possibly insure that the more uniform variety of barrier reef growth occurs over the full longitudinal extend of the discharge receiving region of the electrode toward the end(s) that is electrically isolated from current return to ground apart from through the current return tines 74, 76. At least, however, unwanted arcing and streaming at the electrode ends may be avoided or substantially suppressed.

Applicants have determined that as the skin effect increases with higher frequency, less and less of the original conductor cross-sectional area is actually utilized to conduct the current through the cable. This can cause thermal management problems with the cable since the AC resistance of the cable due to skin effect can be significantly larger than what the DC resistance would be. It is also not always feasible to simply increase the conductor size (e.g. the diameter of the center conductor) since the skin effect dominates in this relatively high frequency application. As an example, doubling the diameter of a center conductor from 0.162" to 0.324" would only increase the cross-sectional area by a factor of 2.2 assuming a skin effect associated with a frequency of 9 kHz (a skin depth of ~27 mils). In the DC case, doubling the diameter would increase the cross-sectional area by a factor of four since the area is proportional to the diameter squared. As a result, one does not achieve a significant improvement in cross-sectional area through such an increase in the conductor diameter.

According to aspects of an embodiment of the present invention applicants propose the use of a coaxial cable with a litz wire center conductor. Litz wire (or litzendraht, meaning "woven wire" in German) is a multi-stranded wire where each strand is insulated from each other and wound in a uniform pattern, which can be specifically designed, e.g., minimize the skin effect and make the to make the proximity effect consistent for each of the strands in the wire. The individual small wire strands are selected to ensure that all of the wire cross section is utilized and the current density throughout the individual strands is not reduced or varied due to skin effect. The frequency of the pulse therefore determines the individual wire strand size. In addition, the strands and bundles are woven and twisted through the overall wire assembly to ensure that each strand tends to take all possible positions through the wire cross-section, ensuring that the proximity effect is consistent across all wire strands and each strand carries an equal share of the overall current through the wire. As a result, e.g., the AC resistance of litz wire can, e.g., be made to be much closer to the DC resistance expected for the same cross-sectional area (as opposed to a normal stranded wire of the same equivalent size). In this manner, according to aspects of the present invention applicants propose to enable the use of the entire center conductor cross-sectional area for conducting current through the coaxial cable. This can minimize the size of the cable and also reduce the losses and thermal dissipation within the cable, and, e.g., when used in combination with above noted sections of, e.g., high power solid state magnetic switched pulsed power delivery systems at high pulse repetition rates, resolve or at least alleviate the above noted problems.

Applicants also propose according to aspects of an embodiment of the present invention to provide for a litz construction of the outer braid of a suitable coaxial cable, although, in many cases, the thickness of the braid is typically much smaller than the cable center conductor because it is applied at a relatively large diameter on the cable (over the insulation applied on top of the center conductor).

Litz wire can be manufactured in a standard method by a wire manufacturer (such as New England Wire Technologies in Lisbon, N.H.). The current handling capability required by the cable can be used to determine the overall equivalent size of the litz wire and the individual strands can be chosen such that each is smaller than (or approximately the same as) the expected skin depth of the pulse. Using the prior example with a 9 kHz fundamental frequency and corresponding skin depth of ~27 mils, e.g., a wire strand size of 30 AWG (with a strand diameter of ~10 mils) would normally be recommended to ensure that current flows through the entire strand in a consistent current density. An insulating material (such as PVC, Teflon, etc.) can then be extruded over the litz wire center conductor and a coaxial braid can also be applied over the insulation, which may, as noted above also be in the form of a litz wire construction. The thickness of the insulation can be determined by the voltage insulation required between the center conductor of litz wire construction and the braid, (e.g., by the nature of the voltage of the pulse being conducted by the cable). Finally, an insulating jacket (such as rubber) can be extruded over the braid to protect the cable from physical damage.

Figure 11:
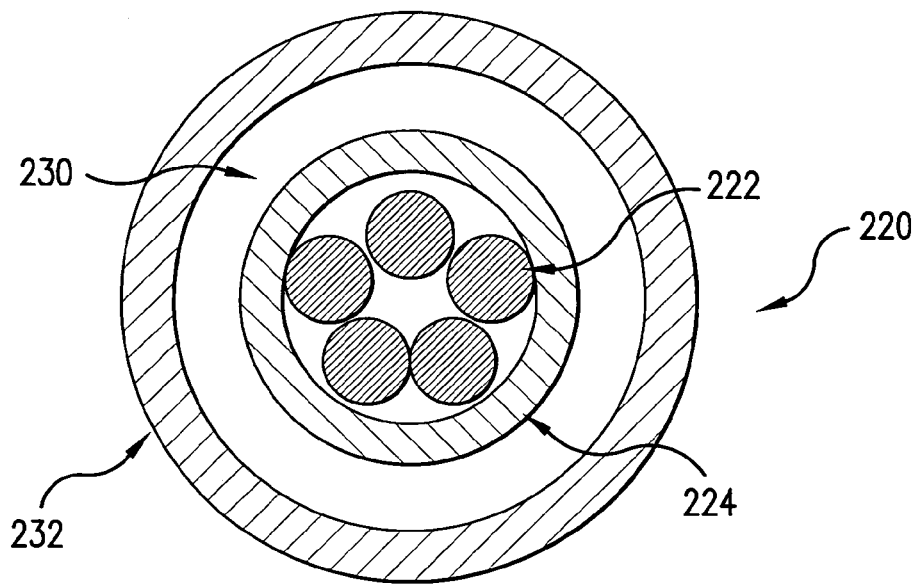
FIG. 11 illustrate schematically in cross-section a power supply cable according to aspects of an embodiment of the present invention.

As is illustrated in FIG. 11 in cross section and partly schematically, a coaxial cable 220, which may be used to connect, e.g., the HVPS or Resonant charger modules (e.g., resonant charger circuits) to the commutator module or the commutator module to the compression head module or portions of the HVPS to each other. The coaxial cable may be formed of a 3 AWG equivalent wire size litz wire center conductor, e.g., with a plurality of, e.g., five litz wire bundles 222, a PVC insulation 224, a 3 AWG equivalent braid conductor 230 and a TPE insulation jacket 232. The 3 AWG equivalent litz wire 222 may be a 5.times.5.times.21/30 type 2 litz wire, e.g., made by New England Wire Technologies, with, e.g., a single polyurethane-nylon (MWC80) insulation sleeve 224 and an overall conductor diameter of 0.349"+009/−0.018" (for the litz wire center conductor and a 0.409" nominal diameter over the PVC insulation). This litz configuration is an overall wire with 5 bundles of 5 smaller bundles, each of the smaller bundles made up of 21 strands of 30 AWG size wire.

The braid shield conductor may be a 30 AWG tinned Copper braided shield, with approximately 100% minimum coverage and a circular mil cross-sectional area equivalent to 3 AWG, with an OD over the braid of 0.575" nominal. The outer jacket may be, e.g., a 0.050" Thick TPE with an OD over insulation of 0.675"+0.020/−0.029". With regard, to, e.g., voltage isolation, the conductors and cable can be rated at 3300 V rms between the center conductors 222 and the shield 230, with both center conductors 222 and shield 230 rated for 110 A rms. The litz wire individual strand sizing may be such that the current will be, e.g., a series of half-sinusoids with, e.g., a duration of ~55 µs and a peak current of ~250 A, and the litz wire individual strands should be sized accordingly as described earlier, e.g., at 30 AWG strand size. The cable may have also an operating temperature range of from 10° C. to +150° C.

Figure 12A:
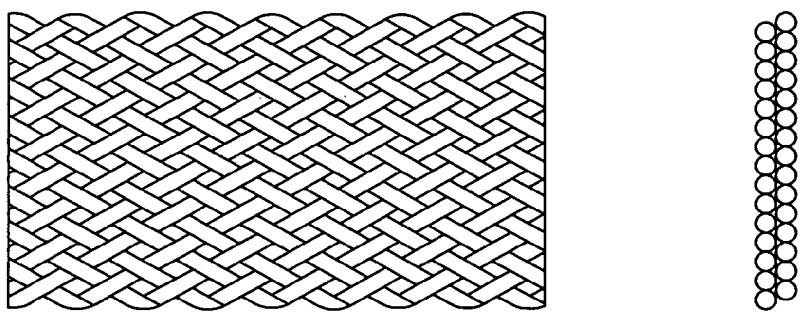
FIGS. 12A and 12B illustrate in plan view and in cross section and partly schematically aspects of an embodiment of the present invention comprising a construction for a coaxial cable shield layer in rectangular braided litz wire or rectangular compacted litz wire configuration.
Figure 12B:
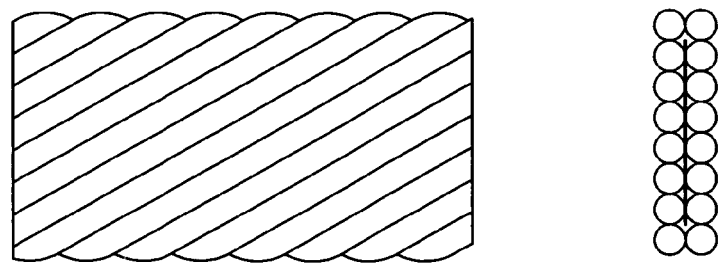

FIGS. 12A and 12B show schematically, respectively, a braided litz wire construction and a compacted litz wire construction, either of which may be used for the braid shield 230 and may be obtained from Cooner Wire Inc. of Chatsworth, Calif. under the name Type 7 braided litz cable or Type 8 rectangular litz wire. In such a case, the weave of the shield 230 shown in FIG. 12A and or the spiral form of the configuration of the compacted shield 230 may be comprised of single wires, still exhibiting litz wire characteristics of multiple wires, themselves in a litz wire configuration.

While the particular aspects of embodiment(s) of the GAS DISCHARGE LASER SYSTEM ELECTRODES AND POWER SUPPLY FOR DELIVERING ELECTRICAL ENERGY TO SAME described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present GAS DISCHARGE LASER SYSTEM ELECTRODES AND POWER SUPPLY FOR DELIVERING ELECTRICAL ENERGY TO SAME is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented.

We claim:

1. A gas discharge laser system comprising:
   an electrode power supply system operating at 4 kHz and above including:
   a magnetic switch pulse compression system having at least one stage of pulse compression between a charging capacitor and a peaking capacitor, the peaking capacitor electrically connected across a pair of electrodes forming a gas discharge region between the electrodes;
   a high voltage power supply supplying voltage to the charging capacitor;
   a resonant charger circuit within the high voltage power supply;
   a connector cable making electrical connection between at least one of:
   the high voltage power supply and a commutator module; or
   between the resonant charger circuit and the commutator module; or
   between the commutator module and the compression head module; or
   between portions of the high voltage power supply; and
   wherein the connector cable includes a coaxial cable having a core including a plurality of strands in a litz wire configuration, the litz wire configuration having each one of the plurality of strands insulated from each other one of the plurality of strands and each one of the plurality of strands is wound in a uniform pattern, the uniform pattern minimizing a skin effect for each of the plurality of strands, wherein the skin effect is determined by the operating frequency.

2. The laser system of claim 1 further comprising:
the coaxial cable comprising a shield comprising a plurality of braided.

3. The laser system of claim 2 wherein each litz wire in the shield comprises a single wire configuration.

4. A gas discharge laser system comprising:
an electrode power supply system operating at 4 kHz and above including:
a magnetic switch pulse compression system having at least one stage of pulse compression between a charging capacitor and a peaking capacitor, the peaking capacitor electrically connected across a pair of electrodes forming a gas discharge region between the electrodes;
a high voltage power supply supplying voltage to the charging capacitor;
a resonant charger circuit within the high voltage power supply;
a connector cable making electrical connection between at least one of:
the high voltage power supply and a commutator module; or
between the resonant charger circuit and the commutator module; or
between the commutator module and the compression head module; or
between portions of the high voltage power supply; and wherein the connector cable comprising: a plurality of separate wires selected each having a size determined by the skin effect at operating frequency.

5. The laser system of claim 4 further comprising:
the connector cable being a coaxial cable comprising a shield comprising a plurality of braided litz wires.

6. The laser system of claim 5 wherein each litz wire in the shield comprising a single wire.

7. The laser system of claim 4 wherein:
the wire size is selected to enable the entire cross sectional area to carry current at a consistent current density with a skin effect at operating frequency.

8. The laser system of claim 5 wherein:
the wire size is selected to enable the entire cross sectional area to carry current at a consistent current density with a skin effect at operating frequency.

9. The laser system of claim 6 wherein:
the wire size is selected to enable the entire cross sectional area to carry current at a consistent current density with a skin effect at operating frequency.

10. The laser system of claim 1 wherein the coaxial cable comprising a shield comprising a plurality of compacted litz wires.

11. The laser system of claim 2 wherein each litz wire in the shield comprises a multiple wire configuration.

12. The laser system of claim 4 wherein the coaxial cable comprising a shield comprising a plurality of compacted litz wires.

13. The laser system of claim 5 wherein each litz wire in the shield comprises a multiple wire configuration.

14. The laser system of claim 1, wherein the uniform pattern makes a proximity effect consistent for each of the plurality of strands.

15. A gas discharge laser system comprising:
an electrode power supply system having an operating frequency of 4 kHz and above including:
a high voltage power supply supplying voltage to a charging capacitor;
a resonant charger circuit within the high voltage power supply;
a litz wire configuration connector cable electrically connecting portions of the high voltage power supply or between the high voltage power supply and the charging capacitor wherein the litz wire configuration connector cable includes,
a coaxial cable includes a core having a plurality of strands in a litz wire configuration; and
a smaller cross-sectional area sized for a required power conductance at the operating frequency than a cross-sectional area for a non-litz wire configuration connector cable sized for the required power conductance at the operating frequency.

* * * * *